Dec. 8, 1942.      C. L. EKSERGIAN      2,304,346
RIM AND VALVE STEM ARRANGEMENT
Filed Aug. 1, 1940      2 Sheets-Sheet 1
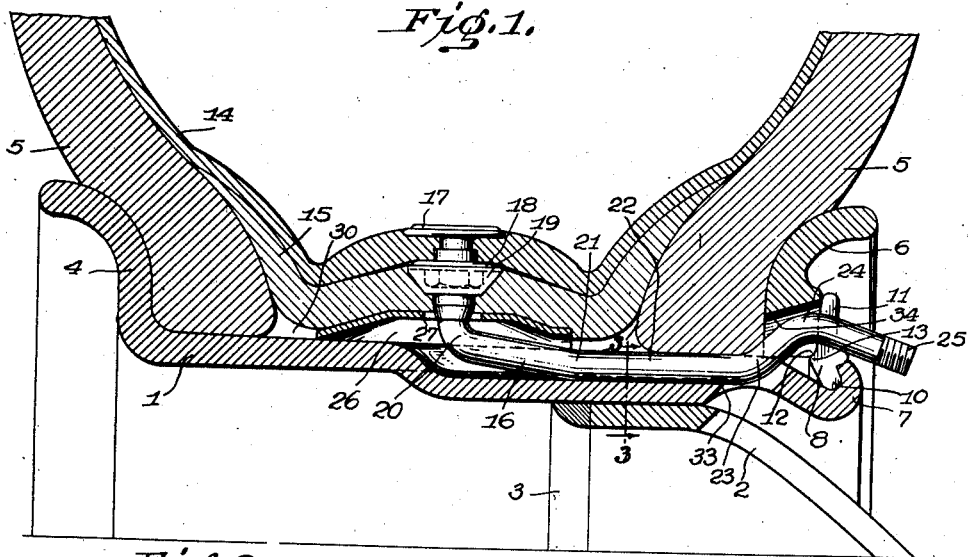
INVENTOR.
Carolus L. Eksergian
BY
ATTORNEY.

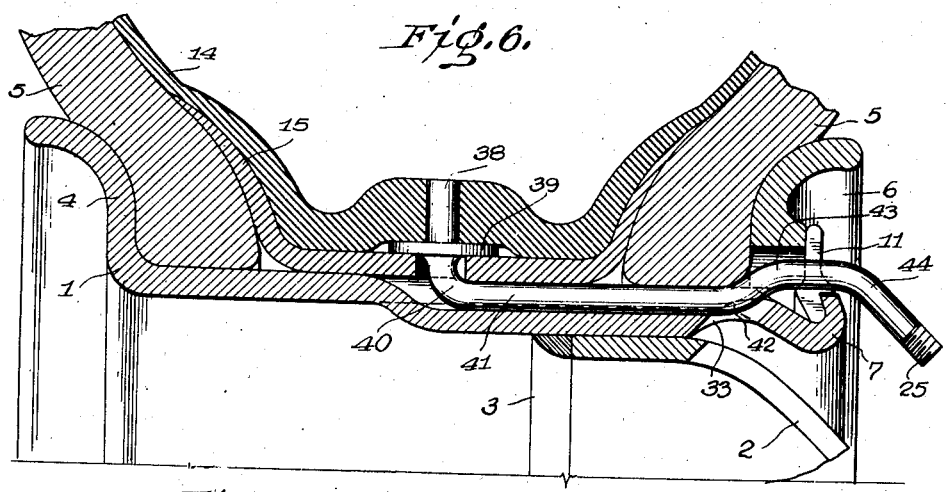
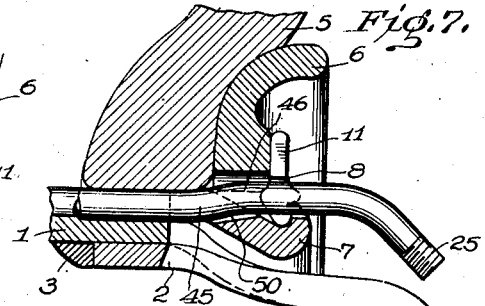
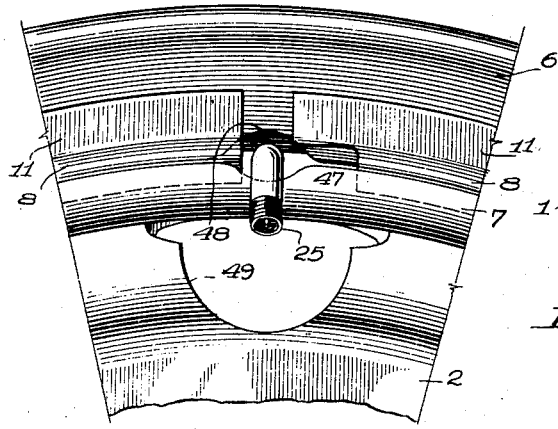
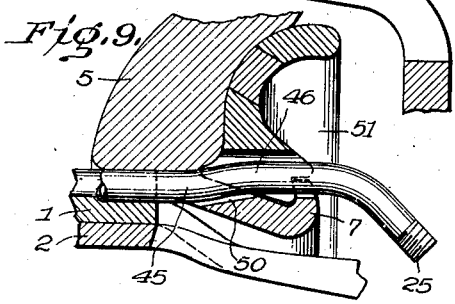
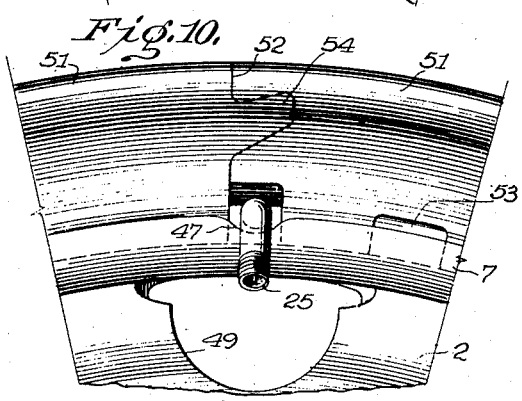

Patented Dec. 8, 1942

2,304,346

UNITED STATES PATENT OFFICE 2,304,346

RIM AND VALVE STEM ARRANGEMENT

Carolus L. Eksergian, Detroit, Mich., assignor to Budd Wheel Company, Philadelphia, Pa., a corporation of Pennsylvania Application August 1, 1940, Serial No. 349,056

7 Claims. (Cl. 152—427)

The present invention relates to valves or valve stems for use with vehicle tires, and to tire rims cooperating therewith, particularly for heavy wheels, such as are used in trucks and the like.

The principal object of the invention is to provide a device of this kind which will not weaken the rim, by cutting away material at improperly chosen locations, or cutting away too much material, to form a passage for the valve stem.

While in general the invention contemplates providing a valve stem bent substantially at right angles, so as to have its end extend laterally outward from the wheel rim, substantially parallel to the axis of the wheel, it differs from prior constructions of this nature in that whereas such earlier types required the rim to be extensively apertured or slotted at some point or points of its inner web, so as to produce incipient weakness at which failure of the rim might start later, in accordance with the present invention the stem passes over the said web and above the gutter.

In present-day wheels it is customary to secure the rim to the supporting flange by welding, and in the forms chosen for illustration it is therefore assumed that arc-welding has been used for this purpose.

For a better understanding of the invention, reference should be had to the present specification and the drawings accompanying the same.

In said drawings:

Fig. 1 is a fragmentary cross section through a tire rim carrying a tire with an inner tube equipped with a valve and stem and embodying the invention;

Fig. 2 is a corresponding side elevation of the rim and the retaining and locking rings;

Fig. 3 is a fragmentary sectional view on the plane indicated by the line 3—3 of Fig. 1, only the rim and its supporting flange being shown;

Fig. 4 is a fragmentary cross section corresponding to Fig. 1, but illustrating a slightly modified form of valve stem and retaining ring;

Fig. 5 is a perspective view of a cupped washer for holding the tire flap spaced above the web of the rim, to provide clearance for the valve stem, as shown in Fig. 1;

Fig. 6 is a fragmentary cross section corresponding to Fig. 1 but showing an embodiment wherein the washer is not used;

Fig. 7 is a fragmentary cross section of a slightly modified form thereof, and

Fig. 8 is a fragmentary side elevation of the same.

Fig. 9 is a fragmentary cross section of a further modified embodiment; and

Fig. 10 is a fragmentary side elevation corresponding thereto; and

Fig. 11 is a fragmentary cross section af a still further modified embodiment.

Referring first to the form illustrated in Figs. 1, 2, 3 and 5, there is shown a metal wheel rim 1, carried by a spider or wheel body member 2 which is inserted thereinto, the two being rigidly and permanently secured together in any desired way, preferably by adding metal by arc-welding, as shown at 3. It will be understood that considerable stiffness is imparted to the connection by reason of the fact that even initially the spider preferably fits tightly within the rim, thus eliminating any play or looseness, and that the material 3 added by the arc-welding converts the whole into a single rigid unitary structure.

At one side edge of the rim and integral therewith there is a curved upstanding flange 4, adapted to bear against one bead of the tire 5, while at the other side of the rim there is a correspondingly shaped removable ring member 6, which bears against the other bead of the tire 5. The rim 1 is here shown as provided with a gutter portion 7 on its remaining side edge, and a locking device 8 cooperates with said gutter and with the ring 6, to lock the same in place.

This locking device is also a ring, but it has a cut or split therein, producing the edges 9 shown in Fig. 2. By reason of the configuration of the locking member 8, it is clear than when its inner edge or bead 10 is engaged in the gutter 7, and its outer flange 11 bears against the adjacent portion of the continuous ring 6, the parts are securely interlocked by the outward pressure of the tire, since a portion 12 of the ring 6 fits over a projection 13 of the split ring 8, as best shown in Fig. 1, thus preventing the split ring from either expanding outward radially, or slipping off laterally from the gutter 7. A portion of one end of the split ring 8 may be cut away as shown at 32 to provide entrance for a suitable tool when the said ring 8 is to be pried off the rim, in dismounting tires.

Within the tire 5 is the usual inner tube 14, a tire flap 15 being provided in the customary way, to protect the inner portions of the tube from chafing against the rim. A tubular valve stem 16 is secured to the inner tube 14, as by the flange 17, washer 18 and nut 19, to make an air-tight joint therewith in the usual manner, this stem 16 being sharply bent through somewhat less than a right angle as shown at 20 and again bent slightly at 21, so as to bring out a portion 22 of the stem substantially parallel to the axis of the wheel. The stem 16 is then bent slightly upward at 23, and again downward at 24, terminating in the customary threaded end 25, to receive the usual valve cap.

In order to prevent injury to the stem 16 where it leaves the tire flap, use is made of a cupped washer 26, shown in section in Fig. 1 and in perspective in Fig. 5. This washer has a central opening 27 to receive the stem 16 preferably with considerable clearance, and is concave downward as shown best in Fig. 1, so as to maintain the tire flap 15 elevated above the stem 16. It will be noted that a small segment is cut off one end of the washer at 28, and that a raised or arched portion 29 extends radially inward from the chord of such segment, to provide a free space for the passage of the stem 16.

In order to avoid the necessity of providing any cuts or grooves in the bottoms of the tire beads, the entire stem 16 is brought inward radially a sufficient distance to bring the outer edge of the portion 22 thereof approximately into line with the cylindrical outer surface 30 of the rim 1, and in order to do this a suitable depression 31 preferably is formed in such rim, as shown clearly in the cross sectional view, Fig. 3. It will be noted that the depression or trough 31 is much wider than would be necessary to accommodate merely the stem 16 and that the curves defining the junction of said trough with the normal surface 30 of the rim are of relatively large radius, so as to avoid any material weakening of the rim at this location. It will be noted also that the inner wheel flange or spider 2 is similarly bent, so as to maintain continuous contact with the rim.

Reference to Figs. 1 and 3 shows that the stem 16 is brought out to one side of the rim without cutting any portion of the gutter 7, this being accomplished by reason of the bends in the stem 16, already mentioned. While there is a hole or cavity 33 in the portion of the rim 1 adjacent to the gutter 7 to provide clearance for the bend 23 of said valve stem, as shown in Fig. 1, this hole is located at such a distance from the main portion of the gutter and its outer side wall that it does not appreciably weaken the rim in any way. The cavity 33 may be described as located at the juncture of the rim 1 and the inner side wall of the gutter.

It will be noted that in this form of device the rim 1 is continuous throughout its extent, clearance being provided for the valve stem by bending the same out of the way, and that the gutter 7 is not weakened by any notches or cuts therein since the said valve stem passes over the outer wall of the gutter, radially beyond the same, solely a single hole 33, located as described preferably being provided to clear the bend 23 of the valve stem as shown, which avoids the necessity of cutting the tire beads. A suitable hollow 34 may be formed in the inner circumference of ring 6 to accommodate the bend 24 of the stem 16, as shown in Figs. 1 and 2.

In the form shown in Fig. 4, only slight changes have been made. The rim 1 and the supporting spider 2 are the same as in the form already described, but instead of having a continuous ring such as 6 of Fig. 1, to bear against the bead 5 of the tire, a split ring 35 is provided which itself interlocks with the gutter 7 by having a projecting nose 36 to engage in the same as shown. The stem 16 is bent to a shape slightly different from that shown in Fig. 1, but it is obvious that such changes are more or less unimportant and are disclosed merely to illustrate various alternative configurations of said stem. Aside from the fact that the ring 35 is here the sole lateral retaining device for the tire bead, that is, it combines the functions served by the solid ring 6 and the split locking ring 8 of Fig. 1, there is no material difference between these two embodiments of the invention. Of course a suitable archway or groove 37 may be provided in the ring 35, to clear the valve stem 16 as shown.

Passing now to the embodiment illustrated in Fig. 6, it will be noted that here again only slight differences are involved over the Fig. 1 form. 1 is the rim having the tire retaining flange 4 to engage a bead 5 of the tire, which as before contains the inner tube 14 and the tire flap 15. The rim is carried by the spider 2 secured by the arc weld 3, and has the gutter 7 like that of Fig. 1 at its other side edge. A solid ring 6, and a split ring 8, substantially identical with those shown in Fig. 1, are provided.

The valve stem 38 is here shown secured in a somewhat different way to the inner tube 14, eliminating some of the complication of the Fig. 1 form of attachment. Here no nuts are employed, but the cylindrical inner end of the tube 38 is vulcanized or otherwise secured directly to the rubber of the inner tube 14, and a flange 39 formed on said valve stem bears against the outer face of the inner tube 14 as shown. Immediately beyond the flange 39 the stem 38 has substantially a right angle bend 40, thus bringing the portion 41 of the stem out substantially parallel to the axis of the wheel, up to the bend 42, which brings the stem again outward at an angle to the next bend 43, whence it again proceeds parallel to the portion 41, to the final bend 44, at which the stem inclines inwardly at a convenient angle to give access to the threaded end 25 thereof as shown.

Passing now to the form illustrated in Figs. 7 and 8, it will be seen that an important difference between this form and that of Fig. 6 is that the valve stem eliminates the sharp bends at 42 and 43 and substitutes therefor the relatively gentle bends 45 and 46, thus approaching nearer to being substantially straight. This is accomplished in this form by slightly cutting away the outer edge of the gutter 7 as shown at 47, to provide an arcuate groove and by providing a cooperating groove 48 adjacent the same in the ring 6. The split ring 8 does not differ from that of the previous forms.

Preferably an opening 49 is provided in the wheel flange 2 adjacent the groove 47 in the gutter 7, to give room for manipulating the valve when applying or removing the cap or the air hose connections for inflating the tire. It will be noted that the hole 50 in the rim 1 for accommodating the valve stem differs slightly from the corresponding hole 33 of Fig. 1, to correspond with the slightly different configuration of the valve stem. In all other respects, the form shown in Figs. 7 and 8 is substantially the same as the Fig. 1 form.

Referring now to the embodiment shown in Figs. 9 and 10, it will be seen that this form is of the same general type as that of Fig. 4, namely, there is no separate retaining or locking ring, and instead the ring 51 is split, preferably along a line such as 52 of Fig. 10, which provides an interlock between the abutting ends of the ring 51. As in the outer edge of the Fig. 8, form, a groove or depression 47 is formed in the gutter 7 to accommodate the valve stem which is of the same general shape as that disclosed in Fig. 7, that is, it has the same slight bends at 45 and 46, and the hole 50 in the rim 1 is substantially the same as that shown in Fig. 7.

A suitable cutaway portion 53 may be provided in the ring 51 as shown in Fig. 10, to facilitate prying off the ring 51 when dismounting the tire. It will be noted also that the tongue 54 in the ring 51 is arranged at a suitable angle to allow the two abutting ends of the ring to slide into and out of engagement at an angle, thus improving the interlocking action and also avoiding a straight radial joint. In other respects, this form does not differ materially from the Fig. 7 form.

A further slight modification of the form shown in Fig. 1 results in the embodiment disclosed in Fig. 11. In this form the ring 6 is formed without a split, but has a groove 34 cut therein, like that shown in Fig. 2. A split retaining ring 8 cooperates with the continuous ring 6 and this ring 8 and its flange 11 are also shaped as shown in Fig. 2. The gutter 7 is not cut or depressed in any way, nor is there any hole made in the rim 1, which in other respects is depressed adjacent the valve stem 55 just as shown in Fig. 3. The said valve stem 55 is bent upward at 56 and then back again parallel to itself at 57, and finally downward at 58, terminating in the threaded end 25.

As shown, the bottom of the gutter in each of the figures and its immediately adjacent side walls in each of the figures are substantially continuous and uninterrupted throughout the circumference of the rim, thus insuring a maximum of strength for the main body of the gutter.

Many embodiments of the invention have been disclosed herein, some of which are preferable for one reason and some for another, but all of which embody the same principle of minimum deformation and weakening of the rim or its gutter, while attaining convenience and ease of manipulation of the tire and the valve stem when mounting or dismounting tires.

It is of course obvious that many further changes could be made in various details, and that the forms specifically disclosed herein are given merely as examples of what are at present considered to be preferred embodiments of the invention. Therefore it should be understood that the scope of the invention is defined solely in the following claims.

I claim:

1. A spacing means for use between an inner tube with a bent valve stem, and a rim, to maintain the connection between the inner tube and its valve stem out of contact with the rim, said spacing means being a washer having a substantially flat central portion with a hole therein to receive the valve stem, and a dished outer portion surrounding said flat portion and producing a concavity on one side of the washer, said outer portion having a substantially radially directed groove therein, providing a passageway for the bent valve stem.

2. A washer as defined in claim 1, having additionally the feature that a segment of the outer portion is cut away adjacent the radially directed groove.

3. A wheel rim for use with a pneumatic tire, said rim having a tire retaining flange at one circumferential edge thereof and a gutter at the other edge, said rim having an axially directed depression extending from approximately the mid-point of the rim to the inner edge of the gutter to receive the valve stem for the tire, and further having a portion of the inner wall of the gutter adjacent said depression in said rim removed to receive another part of said valve stem, the main body of the gutter being a substantially continuous annulus having no transverse slots or deformations breaking its continuous annular form at the valve stem location.

4. In combination, a wheel rim, a pneumatic tire seated thereon and having a valve stem bent substantially to an axial direction closely adjacent its inner tube, said rim having a tire retaining flange at one circumferential edge thereof and a gutter at the other edge having a substantially continuous and uninterrupted outer wall of the same contour throughout its circumference, said rim having an axially directed depression to accommodate the valve stem, and having a cavity adjacent the juncture of the wall of said depression, and the inner side wall of the gutter, said valve stem being bent radially outwardly to pass over said outer wall of the gutter, the bend in said stem being received in said cavity.

5. In combination, a wheel rim, a pneumatic tire seated thereon and having a valve stem bent substantially to an axial direction closely adjacent its inner tube, said rim having a tire retaining flange at one circumferential edge thereof and a gutter at the other edge having a substantially continuous and uninterrupted bottom throughout its circumference, said rim having an axially directed depression to accommodate the valve stem, the outer end of said stem extending axially beyond said gutter and passing across the same at a point wholly radially outwardly of the bottom thereof.

6. A wheel rim as defined in claim 4, having also a tire retaining ring and means for securing it at the gutter edge of the rim, said ring being made in one piece and having a groove in its inner edge portion to accommodate the valve stem.

7. A wheel rim as defined in claim 4, having also a tire retaining ring, and separate means for engaging in the rim gutter, for maintaining the said ring in place, both the ring and the said separate means being cut away to accommodate the valve stem.

CAROLUS L. EKSERGIAN.